(12) United States Patent
Doshi et al.

(10) Patent No.: US 9,715,555 B2
(45) Date of Patent: Jul. 25, 2017

(54) SYSTEM, METHOD AND COMPUTER PROGRAM PRODUCT FOR USER REGISTRATION WITH A MULTI-TENANT ON-DEMAND DATABASE SYSTEM

(75) Inventors: Kedar Doshi, Palo Alto, CA (US); Adi Kuruganti, San Francisco, CA (US); Chaitanya Bhatt, Fremont, CA (US); Jayaprakash Pasala, San Mateo, CA (US); Sanjaya Lai, South San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 638 days.

(21) Appl. No.: 13/037,260

(22) Filed: Feb. 28, 2011

(65) Prior Publication Data

US 2011/0214062 A1 Sep. 1, 2011

Related U.S. Application Data

(60) Provisional application No. 61/308,745, filed on Feb. 26, 2010.

(51) Int. Cl.
*G06F 17/30* (2006.01)
*G06Q 10/10* (2012.01)
*H04L 29/08* (2006.01)

(52) U.S. Cl.
CPC .... *G06F 17/3089* (2013.01); *G06F 17/30587* (2013.01); *G06F 17/30876* (2013.01); *G06Q 10/10* (2013.01); *G06F 17/30861* (2013.01); *H04L 67/02* (2013.01); *H04L 67/2819* (2013.01); *H04L 67/2895* (2013.01)

(58) Field of Classification Search
CPC .......... G06F 17/30867; G06F 17/3089; H04L 67/306
USPC ......................... 715/738, 741; 707/781–784
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |

(Continued)

OTHER PUBLICATIONS

FreeSWITCH Wiki, "Multi-Tenant", 3 Nov. 2009, pp. 2-4.*
U.S. Provisional Patent Application No. 60/828,192, filed Oct. 4, 2006.

*Primary Examiner* — Christopher J Fibbi
(74) *Attorney, Agent, or Firm* — Meyertons, Hood, Kivlin, Kowert & Goetzel, P.C.

(57) ABSTRACT

In accordance with embodiments, there are provided mechanisms and methods for user registration with a multi-tenant on-demand database system. These mechanisms and methods for user registration with a multi-tenant on-demand database system can provide user registration of the multi-tenant on-demand database system which takes into consideration a registration of an associated tenant of the multi-tenant on-demand database system. The ability to consider a tenant's registration with the multi-tenant on-demand database system when registering a user with the multi-tenant on-demand database system can improve the management of permissions associated with of the multi-tenant on-demand database system.

16 Claims, 6 Drawing Sheets

(56) References Cited

U.S. PATENT DOCUMENTS

| | | | |
|---|---|---|---|
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,533,064 B1* | 5/2009 | Boesch | 705/67 |
| 7,620,655 B2 | 11/2009 | Larsson et al. | |
| 7,664,861 B2* | 2/2010 | Guntupalli et al. | H04L 12/1818 709/203 |
| 7,698,160 B2 | 4/2010 | Beaven et al. | |
| 7,779,039 B2 | 8/2010 | Weissman et al. | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,200,761 B1* | 6/2012 | Tevanian | H04L 51/12 709/206 |
| 8,275,836 B2 | 9/2012 | Beaven, Deceased et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0052862 A1* | 5/2002 | Scott et al. | 707/1 |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0223022 A1 | 10/2005 | Weissman et al. | |
| 2005/0283478 A1 | 12/2005 | Choi et al. | |
| 2006/0021019 A1 | 1/2006 | Hinton et al. | |
| 2006/0206834 A1 | 9/2006 | Fisher et al. | |
| 2008/0175222 A1* | 7/2008 | Barnea et al. | H04L 29/12594 370/351 |
| 2008/0249972 A1 | 10/2008 | Dillon | |
| 2009/0043798 A1* | 2/2009 | Tan | G06F 8/61 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2010/0049637 A1* | 2/2010 | Laventman et al. | G06Q 10/06 705/30 |
| 2010/0121649 A1* | 5/2010 | Lynch et al. | 705/1.1 |
| 2010/0257456 A1* | 10/2010 | Lieb et al. | 715/741 |
| 2010/0269158 A1* | 10/2010 | Ehler et al. | 726/4 |
| 2011/0083083 A1* | 4/2011 | Kurumai et al. | 715/744 |
| 2011/0113068 A1* | 5/2011 | Ouyang et al. | 707/784 |
| 2011/0218958 A1 | 9/2011 | Warshavsky et al. | |

(56) References Cited

U.S. PATENT DOCUMENTS

| | | |
|---|---|---|
| 2011/0247051 A1 | 10/2011 | Bulumulla et al. |
| 2012/0042218 A1 | 2/2012 | Cinarkaya et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

\* cited by examiner

SYSTEM, METHOD AND COMPUTER PROGRAM PRODUCT FOR USER REGISTRATION WITH A MULTI-TENANT ON-DEMAND DATABASE SYSTEM

CLAIM OF PRIORITY

This application claims the benefit of U.S. Provisional Patent Application 61/308,745 entitled "M&S For Viral Signup In A Corp Social Network," by Doshi et al., filed Feb. 26, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to user access to a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access data in the database using permissions granted to the user which are configured, for example, using the database or a system managing the database. In particular, in conventional database systems users are independent entities, each with an individual set of permissions. Thus, access to the database is granted on a user by user basis.

Unfortunately, granting access in the aforementioned manner is insufficient in a multi-tenant on-demand database system. For example, in a multi-tenant on-demand database system, a database is shared by one or more tenants (e.g. customers that are companies or other entities), where each tenant may include multiple users. Thus, each user may be granted permission to access one or more databases of the multi-tenant on-demand database system based on the permissions granted to the user's associated tenant. Accordingly, it is desirable to provide techniques enabling user registration of the multi-tenant on-demand database system which takes into consideration a registration of an associated tenant of the multi-tenant on-demand database system, to improve the management of permissions associated with of the multi-tenant on-demand database system.

BRIEF SUMMARY

In accordance with embodiments, there are provided mechanisms and methods for user registration with a multi-tenant on-demand database system. These mechanisms and methods for user registration with a multi-tenant on-demand database system can enable embodiments to provide user registration of the multi-tenant on-demand database system which takes into consideration a registration of an associated tenant of the multi-tenant on-demand database system. The ability of embodiments to consider a tenant's registration with the multi-tenant on-demand database system when registering a user with the multi-tenant on-demand database system can improve the management of permissions associated with of the multi-tenant on-demand database system.

In an embodiment and by way of example, a method for user registration with a multi-tenant on-demand database system is provided. In use, a request from a browser of a user for a webpage of a multi-tenant on-demand database system capable of being utilized to register the user with the multi-tenant on-demand database system is received. Additionally, a link associated with the request is decoded to determine an identifier. Further, one of a plurality of preconfigured webpages of the multi-tenant on-demand database system is selected, based on the identifier. Furthermore, the selected preconfigured webpage is sent to the browser of the user for use by the user in registering with the multi-tenant on-demand database system.

While one or more implementations and techniques are described with reference to an embodiment in which user registration with a multi-tenant on-demand database system is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for user registration with a multi-tenant on-demand database system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing user registration with a multi-tenant on-demand database system will be described with reference to example embodiments.

Figure 1:
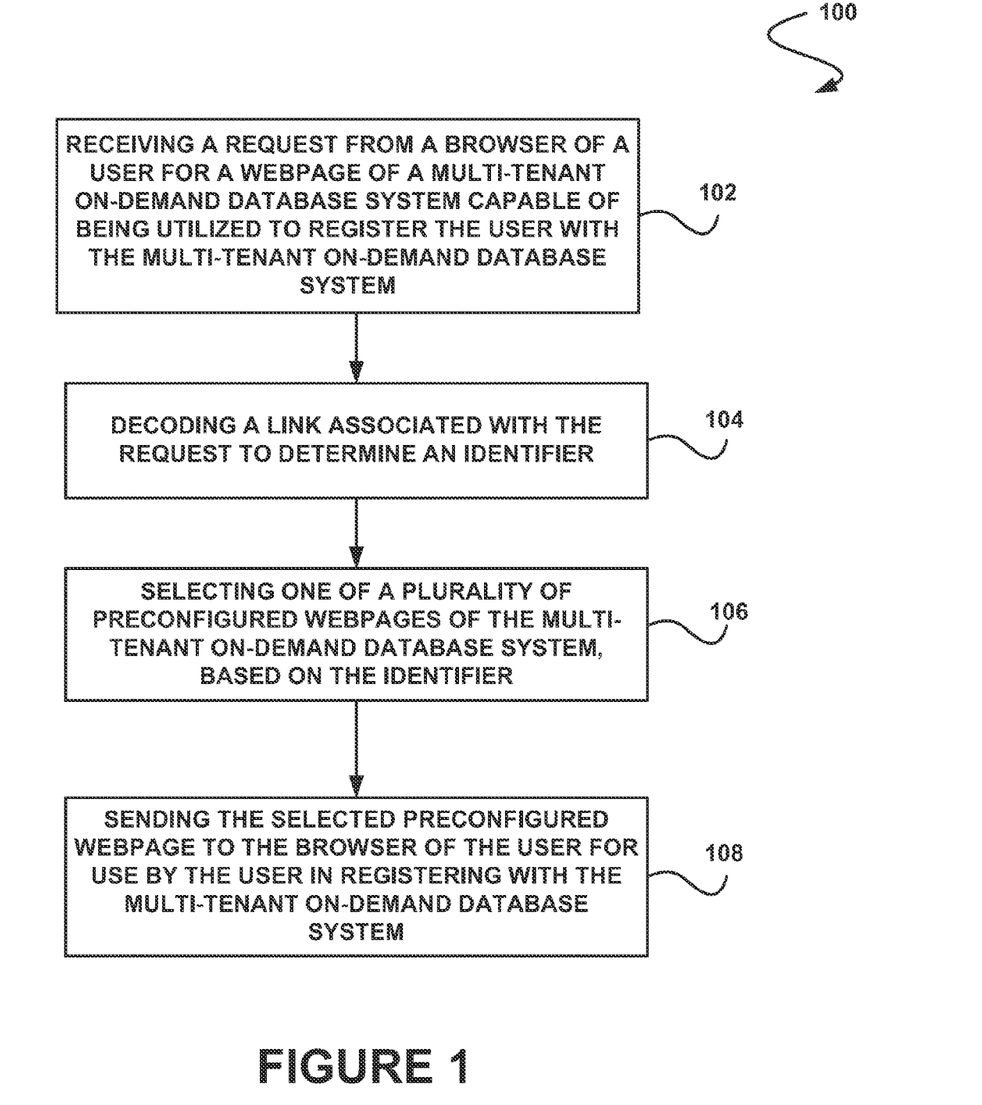
FIG. 1 illustrates a method for user registration with a multi-tenant on-demand database system, in accordance with an embodiment.

FIG. 1 illustrates a method 100 for user registration with a multi-tenant on-demand database system, in accordance with an embodiment.

As shown in operation 102, a request from a browser of a user for a webpage of a multi-tenant on-demand database system capable of being utilized to register the user with the multi-tenant on-demand database system is received. In the present embodiment, the browser of the user may include any interface of a device of the user capable of being utilized to request a webpage of a multi-tenant on-demand database system. For example, the browser may include a web browser for communicating the request from the device of the user over a network (e.g. the Internet) to the multi-tenant on-demand database system. To this end, the request may be received by the multi-tenant on-demand database system.

In one embodiment, the request may be received in response to the user selecting a link, such as a hyperlink [e.g. including a uniform resource locator (URL), etc.]. For example, the link may be included in an email message sent to the user (e.g. by the multi-tenant on-demand database system). Of course, however, the link may be provided to the user in any manner that allows use of the same by the user to request the webpage capable of being utilized to register the user with the multi-tenant on-demand database system. Accordingly, selection of the link by the user may result in transmittal of the request from the device of the user to the multi-tenant on-demand database system.

Additionally, as shown in operation 104, a link associated with the request is decoded to determine an identifier. As noted above, the link may be associated with the request by being utilized by the user to submit the request. Thus, receipt of the request may include receipt of the link used to submit the request, in one embodiment.

In another embodiment, the link may be generated by the multi-tenant on-demand database system (e.g. and included in the email sent to the user by the multi-tenant on-demand database system). For example, the link may be generated to include the identifier. In the context of the present description, the identifier may include any string of characters capable of being utilized to determine one of a plurality of preconfigured webpage to be selected for being sent to the user, as described in more detail below.

In one embodiment, the identifier may include at least a portion of information submitted by the user to the multi-tenant on-demand database system prior to the user sending the request for the webpage of the multi-tenant on-demand database system (e.g. for the purpose of indicating to the multi-tenant on-demand database system a desire to register with the multi-tenant on-demand database system). Such information may include an email address of the user, just by way of example. Further, with respect to such example, the identifier may include a domain included in the email address of the user.

In another embodiment, the identifier may include at least a portion of information submitted by another user registered with the multi-tenant on-demand database system (e.g. for the purpose of inviting the user to register with the multi-tenant on-demand database system). For example, the identifier may be of an existing tenant registered with the multi-tenant on-demand database system that is associated with the user (e.g. that is an employer of the user and optionally the other user, for example).

It should be noted that the link may be decoded in any manner to determine the identifier. In one embodiment, the identifier may be included in the link, and the decoding of the link may include parsing the link to determine the identifier. For example, the identifier may be included in a predetermined location within the link, and the decoding of the link may include parsing the link to determine the identifier at the predefined location. In another embodiment, the identifier may be encoded in the link, such that decoding the link may include decoding the encoded identifier to determine such decoded identifier.

In yet another embodiment, the identifier may not necessarily be directly stored in the link. For example, a reference to the identifier may be included in the link. With respect to such embodiment, the link may be decoded to identify the reference, and the reference may further be used to determine the identifier e.g. utilizing a look-up in a table mapping link references to identifiers, etc.).

Further, as shown in operation 106, one of a plurality of preconfigured webpages of the multi-tenant on-demand database system is selected, based on the identifier. In the context of the present description, each of the preconfigured webpages may be capable of being utilized for at least partially performing a registration process associated with the user (i.e. to at least partially register the user with the multi-tenant on-demand database system). For example, the preconfigured webpages may include fields for receiving input from the user for use by the multi-tenant on-demand database system in setting up an account with the multi-tenant on-demand database system.

Such preconfigured webpages may each be associated with a different type of registration of the user with the multi-tenant on-demand database system. In one embodiment, the preconfigured webpages from which one is selected may include a first preconfigured webpage for registering a new tenant associated with the user and registering the user under the new tenant. In another embodiment, the preconfigured webpages from which one is selected may include a second preconfigured webpage for registering the user under an existing tenant of the multi-tenant on-demand database system.

Just by way of example, the identifier determined from the link may be used to determine whether the user is associated with an existing tenant of the multi-tenant on-demand database system. In one embodiment, it may be determined that the identifier is not of an existing tenant registered with the multi-tenant on-demand database system. Such determination may be made by querying a database storing identifiers of existing tenants registered with the multi-tenant on-demand database system for the identifier determined from the link. If a match is not found, it may be determined that the identifier is not of an existing tenant registered with the multi-tenant on-demand database system, such that the second preconfigured webpage may be selected for registering a new tenant associated with the user and registering the user under the new tenant.

In another embodiment, it may be determined that the identifier is of an existing tenant registered with the multi-tenant on-demand database system. Such determination may be made using the above described query, in which a match is returned, as an option. As another option, the determination may be made automatically (e.g. without necessarily performing any searching of the database), based on knowledge that the link was provided to the user for the purpose of inviting the user to register with the multi-tenant on-demand database system under a tenant determined by another user initiating the invitation. In response to a determination that the identifier is of an existing tenant registered with the multi-tenant on-demand database system, then the second preconfigured webpage may be selected for registering the user under the existing tenant.

Still yet, as shown in operation 108, the selected preconfigured webpage is sent to the browser of the user for use by the user in registering with the multi-tenant on-demand database system. For example, the multi-tenant on-demand database system may select which of the preconfigured webpages is to be sent to the user (e.g. based on a determination using the identifier of whether the user is associated with an existing tenant of the multi-tenant on-demand database system). In response, the multi-tenant on-demand database system may send the selected preconfigured webpage to the browser of the user for use by the user in performing a registration process with the multi-tenant on-demand database system that is appropriate for the user (i.e. based on the aforementioned determination). Optionally, any account (user or tenant) created by the user via the selected preconfigured webpage may include default settings according to information provided the user's browser, such as a preferred language, etc.

By providing the user with one of the preconfigured registration webpages based on the processing of the identifier included in the link used by the user to request the registration, the user may be provided with a registration webpage that is appropriate for the user. For example, where the identifier is used to determine if the user is associated with an existing tenant of the multi-tenant on-demand database system, the user may be provided with a registration webpage that selected based on such determination. In this way, the multi-tenant on-demand database system may optionally avoid creating a new tenant and a new user under that new tenant for every user requesting registration with the multi-tenant on-demand database system, but may instead register user's under existing tenants of the multi-tenant on-demand database system wherever possible. This may improve the management of permissions associated with of the multi-tenant on-demand database system, for example, by reducing overall processing performed by the multi-tenant on-demand database system with respect to user registrations, preventing duplicate tenants from being registered by the multi-tenant on-demand database system (e.g. where a new tenant is created when the tenant already exists), etc.

Figure 2A:
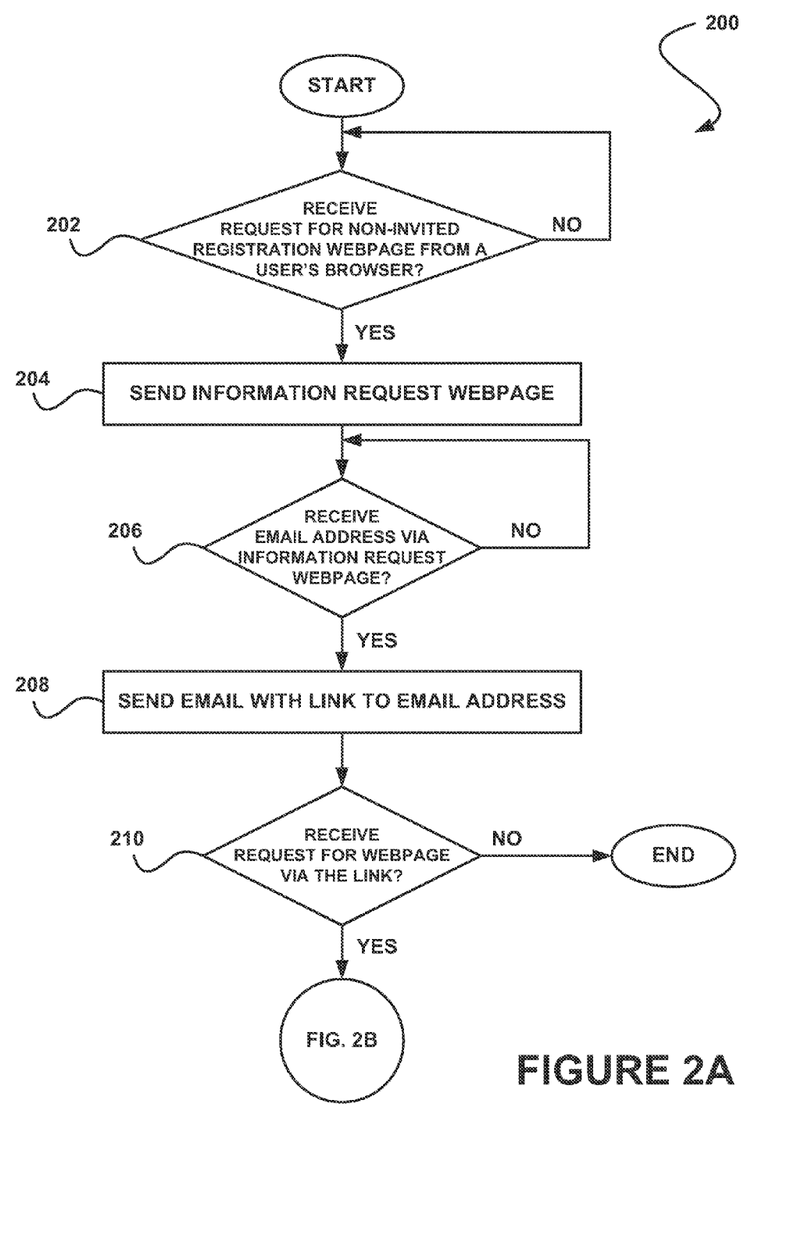
FIGS. 2A-B illustrate a method for a non-invited registration of a user with a multi-tenant on-demand database system, in accordance with an embodiment.
Figure 2B:
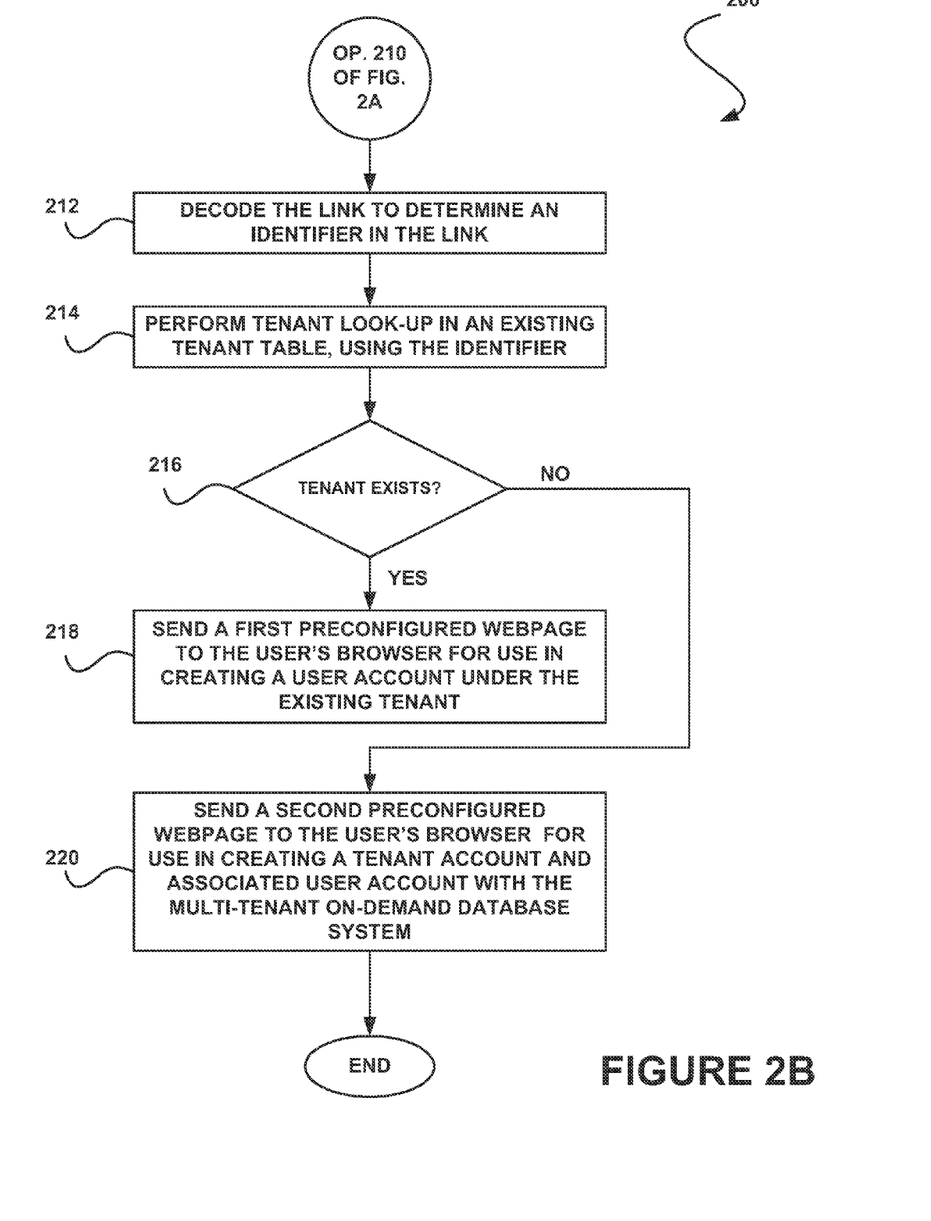

FIGS. 2A-B illustrate a method 200 for a non-invited registration of a user with a multi-tenant on-demand database system, in accordance with an embodiment. As an option, the present method 200 may be carried out in the context of the functionality of FIG. 1. For example, the method 200 may be carried out by the multi-tenant on-demand database system described herein. Of course, however, the method 200 may be carried out in any desired environment. Again, the aforementioned definitions may apply during the present description, As shown in decision 202, it is determined whether a request for a non-invited registration webpage is received from a user's browser. In the context of the present embodiment, the non-invited registration webpage includes a webpage of a multi-tenant on-demand database system that is accessible by the user when the user has not necessarily been invited (e.g. by the multi-tenant on-demand database system) to register with the multi-tenant on-demand database system. For example, the user may directly access the webpage of the multi-tenant on-demand database system, instead of via an invitation received by the user.

In one embodiment, the user may decide on his own volition that he desires to access content, applications, etc. provided by the multi-tenant on-demand database system, and may therefore visit a webpage of the multi-tenant on-demand database system to request registration with the multi-tenant on-demand database system. If it is determined that a request for a non-invited registration webpage has not been received, the method 200 continues to wait for such a request.

However, once it is determined that a request for a non-invited registration webpage has been received, an information request webpage is sent to the user's browser. Note operation 204. The information request webpage may include a webpage with at least one field for receiving input from the user. In the example described with respect to the present method 200, the webpage may request an email address of the user.

It is then determined whether the email address has been received via the information request webpage, as shown in decision 206. For example, it may be determined whether the user has entered an email in the field of the webpage, and selected an option on the webpage to submit the entered email address to the multi-tenant on-demand database system. If it is determined that the email address has not been received, the method 200 continues to wait for an email address to be received.

Once an email address is received via the information request webpage, an email (message) with a link is sent to the email address. Note operation 208. Thus, the email may be sent to the user in response to the user visiting the information request webpage of the multi-tenant on-demand database system and entering the email address of the user in the information request webpage. As another option, the email may be queued and sent as a batch with other emails being sent to other users for similar purposes.

With respect to the present embodiment, the link may include a hyperlink to a process of the multi-tenant on-demand database system, which selects one of a plurality of preconfigured webpages to be provided to the user, as described in more detail below. Such link may be generated by the multi-tenant on-demand database system, in one embodiment.

Further, the link may be generated to reference the aforementioned process, and may also include an identifier associated with the email address of the user. As an option, the identifier may be extracted or otherwise parsed from the email address and incorporated into the link, just by way of example, a domain (i.e. a string representing a domain name) may be extracted from the email address and included in the link.

Moreover, as shown in decision 210, it is determined whether a request for a webpage has been received via the link. For example, the request may be received in response to the user selecting the link in the email, the user copying the link into the browser of the user, etc. If it is determined that the request for the webpage has not been received, the method 200 continue to wait for such a request.

As an option, a status of a response by the user to the email may be tracked by the multi-tenant on-demand database system. For example, if a request from the user via the link is not received within a predetermined period of time (e.g. 30 days, etc.), registration of the user with the multi-tenant on-demand database system via the link, as described below, may be prevented. For example, a request received from the user via the link after the predetermined period of time may not necessarily be processed (i.e. a default notification webpage may be provided to the user instead).

In response to a determination that the request for the webpage has been received via the link, the link is decoded to determine an identifier in the link. Note operation 212. As noted above, the identifier may include a domain from the email address of the user which was included in the link.

A tenant look-up (e.g. query) in an existing tenant table is then performed, using the identifier (operation 214). The existing tenant table may store identifiers of tenants already registered with the multi-tenant on-demand database system. For example, such identifiers may include domain names associated with each of the tenants. Thus, in one embodiment, in response to determining the identifier that is the domain extracted from the email address of the user, a database (i.e. the an existing tenant table of such database) storing identifiers of existing tenants of the multi-tenant on-demand database system may be queried using the determined identifier.

Based on the look-up, it is determined whether a tenant that is associated with the user exists in the multi-tenant on-demand database system. Note decision 216. For example, if the look-up returns at least one match between the identifier determined from the link and an identifier in the existing tenant table, it may be determined that at least one tenant that is associated with the user exists in the multi-tenant on-demand database system (i.e. has already registered with the mufti-tenant on-demand database system). As another example, if the look-up does not return a match between the identifier determined from the link and an identifier in the existing tenant table, it may be determined the user is not associated with any tenant existing in the multi-tenant on-demand database system.

To this end, if it is determined that a tenant that is associated with the user exists in the multi-tenant on-demand database system, a first preconfigured webpage is sent to the user's browser for use in creating a user account under the existing tenant. Note operation 218. For example, the first webpage may allow the user to at least initiate creation of a login name/password and may associate the same with the existing tenant (e.g. in a database), for use in accessing content, applications, etc. of the multi-tenant on-demand database system according to permissions held by the existing tenant. Where the user is associated with multiple existing tenants, the user may select any or all of the existing tenants with which he is associated, such that a user account may be created for the user under each of the selected existing tenants.

On the other hand, if it is determined that the user is not associated with any tenant existing in the multi-tenant on-demand database system, a second preconfigured webpage is sent to the user's browser for use in creating a tenant account and an associated user account with the multi-tenant on-demand database system. Note operation 220. For example, the second preconfigured webpage may allow the user to at least initiate creation of an account for a new tenant of the multi-tenant on-demand database system, such that the user may then be prompted to create a user account (e.g. login name/password) under the new tenant account.

As an option, the new tenant may be registered via the second preconfigured webpage using a preconfigured tenant generated prior to the receipt of the request from the browser of the user in operation 210. For example, before the email with the link is sent to the user in operation 208, but after receiving the email address from the user (as determined in decision 206), a preconfigured tenant (e.g. with default settings, permissions, etc.) may be created, stored on a server of the multi-tenant on-demand database system that is associated with a location of the user (i.e. as determined from the browser of the user), and an identifier of that preconfigured tenant included in the existing tenant table. Thus, the email may be prevented from being sent to the user until the preconfigured tenant has been created, For example, a tenant template may be used to create the preconfigured tenant. When the new tenant is requested to be registered in operation 220, the already created preconfigured tenant may be used as the new tenant for the user. The user may then customize the new tenant (e.g. with profile information, etc.), as desired. This may prevent delays in providing the user with access to the multi-tenant on-demand database system via a new tenant which may otherwise result from any time required to create the new tenant.

Figure 3:
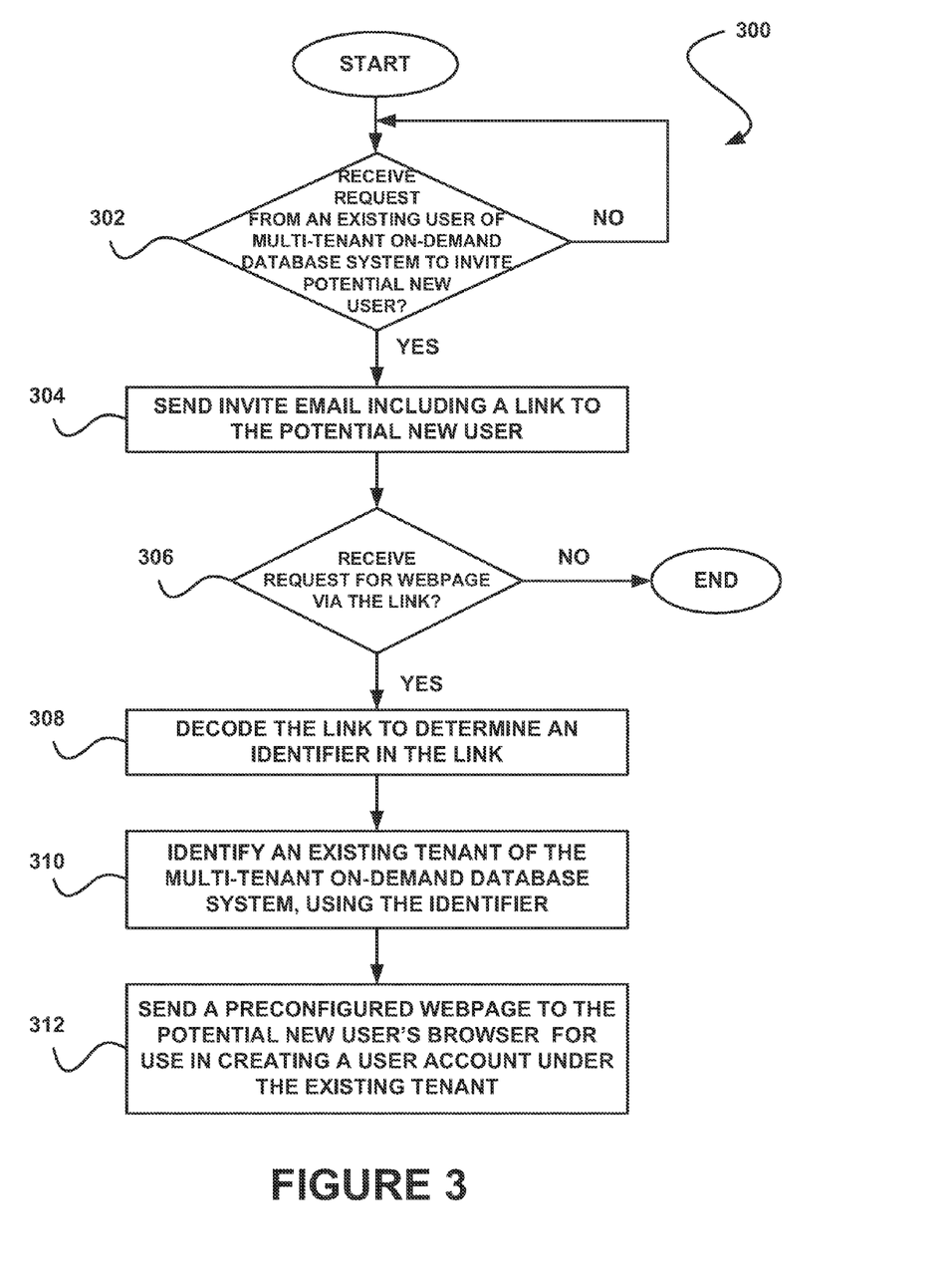
FIG. 3 illustrates a method for an invited registration of a user with a multi-tenant on-demand database system, in accordance with an embodiment.

FIG. 3 illustrates a method 300 for an invited registration of a user with a multi-tenant on-demand database system, in accordance with an embodiment. As an option, the present method 300 may be carried out in the context of the functionality of FIGS. 1-2. For example, the method 300 may be carried out by the multi-tenant on-demand database system described herein. Of course, however, the method 300 may be carried out in any desired environment. Again, the aforementioned definitions may apply during the present description.

As shown in decision 302, it is determined whether a request from an existing user of a multi-tenant on-demand database system to invite a potential new user to the multi-tenant on-demand database system is received. In the present embodiment, the existing user may include a user already registered under an existing tenant of the multi-tenant on-demand database system. Also, the potential new user may include a user not yet registered in any capacity with the multi-tenant on-demand database system.

Optionally, the request may be received using an interface of the multi-tenant on-demand database system, such as a webpage accessible to the existing user which allows the existing user to input information associated with the potential new user for inviting the potential new user to register with the multi-tenant on-demand database system. Such information may include an identifier of an existing tenant of the multi-tenant on-demand database system that is associated with the potential new user (i.e. which employs the potential new user). Such existing user may also be associated with the same existing tenant (i.e. where the existing user and the potential new user are co-workers).

If it is determined that a request from an existing user of a multi-tenant on-demand database system to invite a potential new user to the multi-tenant on-demand database system has not been received, the method 300 continues to wait for such a request. However, once it is determined that such a request has been received, an invite email including a link is sent to the potential new user. Note operation 304. For example, the invite email including the link may be sent to an email address of the potential new user provided by the existing user.

In the present embodiment, the link may include a hyperlink to a process of the multi-tenant on-demand database system, which selects one of a plurality of preconfigured webpages to be provided to the potential new user, as described in more detail below. Such link may be generated by the multi-tenant on-demand database system, in one embodiment. Further, the link may be generated to reference the aforementioned process, and may also include the identifier of the existing tenant.

Additionally, is determined whether a request for a webpage has been received via the link, as shown in decision 306. For example, the request may be received in response to the potential new user selecting the link in the invite email, the potential new user copying the link into the browser of the potential new user, etc. If it is determined that the request for the webpage has not been received, the method 300 continue to wait for such a request.

As an option, a status of a response by the potential new user to the invite email may be tracked by the multi-tenant on-demand database system. For example, if a request from the potential new user via the link is not received within a predetermined period of time (e.g. 30 days, etc.), registration of the potential new user with the multi-tenant on-demand database system via the link, as described below, may be prevented. For example, a request received from the user via the link after the predetermined period of time may not necessarily be processed (i.e. a default notification webpage may be provided to the user instead).

In response to a determination that the request for the webpage has been received via the link, the link is decoded to determine an identifier in the link. Note operation 308. As an option, the identifier may be extracted or otherwise parsed from the link.

As noted above, the identifier may be of an existing tenant of the multi-tenant on-demand database system. To this end, the method 300 may automatically determine (i.e. assume) that the identifier is of an existing tenant, and such tenant may be identified using the identifier (note operation 310). Thus, any searching for an existing tenant associated with the identifier may be avoided.

A preconfigured webpage is then sent to the potential new user's browser for use in creating a user account under the existing tenant. Note operation 312. For example, the preconfigured webpage may allow the user to at least initiate creation of a login name/password and may associate the same with the existing tenant (e.g. in a database), for use in accessing content, applications, etc. of the multi-tenant on-demand database system according to permissions held by the existing tenant.

System Overview

Figure 4:
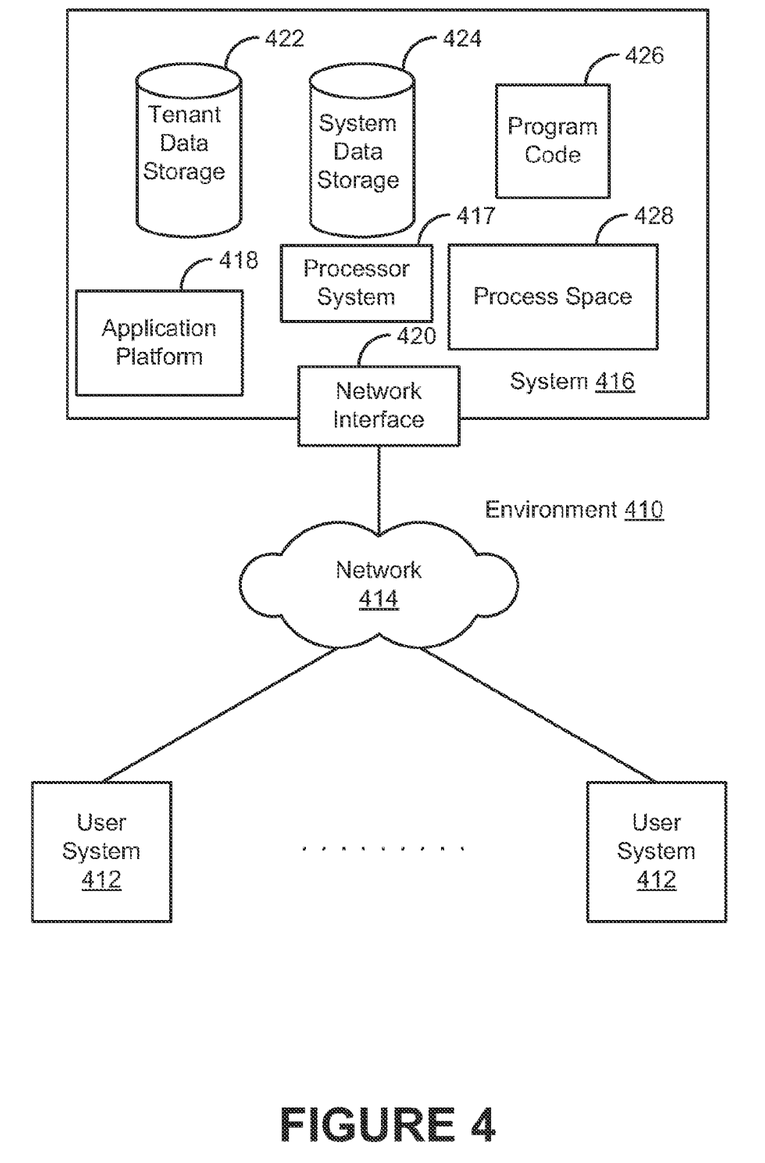
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as UTTP, FTP, AFS WAP, etc. In an example where HTTP is used, user system 412 might include an HTTP client commonly referred to as a "browser" for sending and receiving HTTP messages to and from an HTTP) server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTPS client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system. 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), o non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc. as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein, Similarly, the database object described herein can be implemented as single databases, a distributed database, a collection of distributed databases, a database with redundant online or offline backups or other redundancies, etc., and might include a distributed database or storage network and associated processing intelligence.

Figure 5:
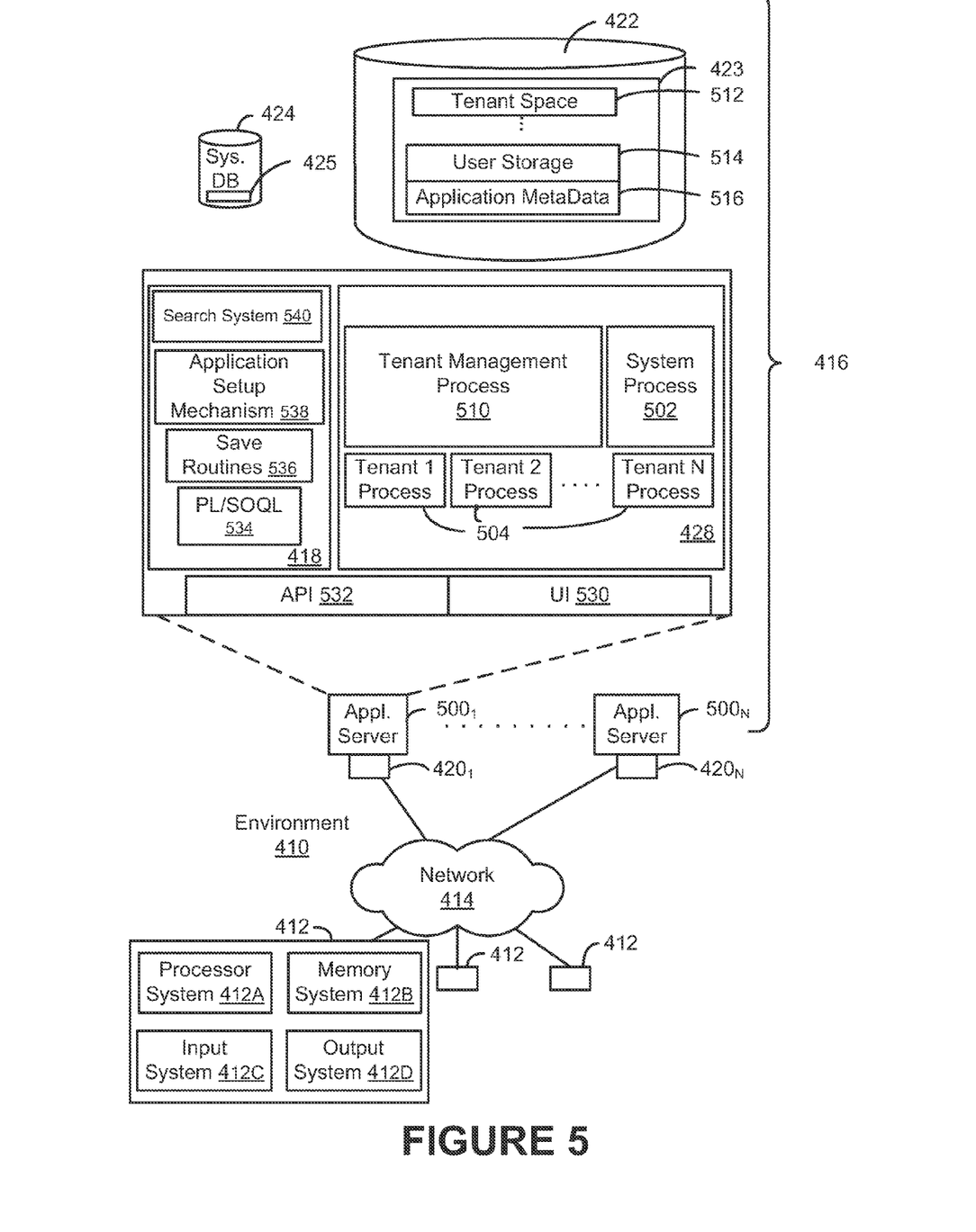
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 41213, input system 412C, and output system 412D. FIG. 5 shows network 414 and system 416. FIG, 5 also shows that system 416 may include tenant data storage 422, tenant data 423, system data storage 424, system data 425, User Interface (UI) 530. Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4, Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might he stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine, Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_5$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500, Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might he organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects, It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A non-transitory computer-readable storage medium having stored thereon a plurality of instructions that are capable of being executed by a computer system to cause operations comprising:

sending, by a multi-tenant system, a link to a potential user of the multi-tenant system, wherein the link includes an identifier generated based on an email address of the potential user, wherein the identifier specifies a tenant with which the potential user is associated, and wherein the link is sent in response to the potential user visiting a request webpage of the multi-tenant system and providing the email address in the request webpage;

receiving, via the link and from the potential user, a request for a webpage operable to create a user account with the multi-tenant system for the potential user;

in response to receiving the request, analyzing the link to determine the identifier included in the link;

determining whether the identifier specifies an existing tenant of the multi-tenant system;

in response to a determination that the identifier specifies an existing tenant:

selecting, by the multi-tenant system, a first webpage of a plurality of webpages, wherein the first webpage is operable to initiate creation of a user account with the multi-tenant system to be associated with the existing tenant;

sending, by the multi-tenant system, the first webpage to a browser of the potential user;

receiving, through the first webpage by the multi-tenant system, account information for the potential user;

in response to receiving the account information, creating, by the multi-tenant system, the user account for the potential user, wherein the user account is given data-access permissions based on the existing tenant; and after creating the user account for the potential user, allowing the user account to access data of the multi-tenant system according to permissions held by the existing tenant: and in response to a determination that the identifier does not specify an existing tenant:

selecting, by the multi-tenant system, a second webpage of the plurality of webpages, wherein the second webpage is operable to initiate creation of a new tenant and a new user account for the potential user under the new tenant;

sending, by the multi-tenant system, the second webpage to the browser of the potential user;

receiving, through the second webpage by the multi-tenant system, the account information for the potential user; and in response to receiving the account information, creating, by the multi-tenant system, the new tenant and the new user account, wherein the new user account is given data-access permissions based on the new tenant.

2. The non-transitory computer-readable storage medium of claim 1, wherein the identifier includes at least a portion of the email address of the potential user.

3. The non-transitory computer-readable storage medium of claim 1, wherein determining the identifier includes parsing the link to extract the identifier.

4. The non-transitory computer-readable storage medium of claim 1, wherein multiple user accounts are registered under a single tenant.

5. The non-transitory computer-readable storage medium of claim 1, wherein creating, by the multi-tenant system, the user account includes automatically associating, in a database of the multi-tenant system, the created user account with the existing tenant.

6. The non-transitory computer-readable storage medium of claim 1, wherein the data of the multi-tenant system includes at least one of content or applications of the multi-tenant system, such that after creating the user account for the potential user under the existing tenant, the user account is allowed to access the at least one of content or applications of the multi-tenant system according to the permissions held by the existing tenant.

7. The non-transitory computer-readable storage medium of claim 1, wherein the determining whether the identifier specifies an existing tenant of the multi-tenant system comprises:

querying a table of the multi-tenant system for the identifier, wherein the tables includes identifiers of a plurality of existing tenants of the multi-tenant system; and in response to the identifier matching one or more identifiers of the plurality of existing tenants, determining that the identifier specifies an existing tenant.

8. The non-transitory computer-readable storage medium of claim 1, further comprising:

after creating the new user account for the potential user, allowing the new user account to access data of the multi-tenant system according to permissions held by the new tenant.

9. A method, comprising:

sending, by a multi-tenant system, a link to a potential user of the multi-tenant system, wherein the link includes an identifier generated based on an email address of the potential user, wherein the identifier specifies a tenant with which the potential user is associated, and wherein the link is sent in response to the potential user visiting a request webpage of the multi-tenant system and providing the email address in the request webpage;

receiving, via the link and from the potential user, a request for a webpage operable to create a user account with the multi-tenant system for the potential user;

in response to receiving the request, analyzing the link to determine the identifier included in the link;

determining whether the identifier specifies an existing tenant of the multi-tenant system;

in response to a determination that the identifier specifies an existing tenant:

selecting, by the multi-tenant system, a first webpage of a plurality of webpages, wherein the first webpage is operable to initiate creation of a user account with the multi-tenant system to be associated with the existing tenant;

sending, by the multi-tenant system, the first webpage to a browser of the potential user;

receiving, through the first webpage by the multi-tenant system, account information for the potential user;

in response to receiving the account information, creating, by the multi-tenant system, the user account for the potential user, wherein the user account is given data-access permissions based on the existing tenant; and after creating the user account for the potential user, allowing the user account to access data of the multi-tenant system according to permissions held by the existing tenant; and in response to a determination that the identifier does not specify an existing tenant:

selecting, by the multi-tenant system, a second webpage of the plurality of webpages, wherein the second webpage is operable to initiate creation of a new tenant and a new user account for the potential user under the new tenant;

sending, by the multi-tenant system, the second webpage to the browser of the potential user;

receiving, through the second webpage by the multi-tenant system, the account information for the potential user; and in response to receiving the account information, creating, by the multi-tenant system, the new tenant and the new user account, wherein the new user account is given data-access permissions based on the new tenant.

10. The method of claim 9, wherein the identifier includes at least a portion of the email address of the potential user.

11. The method of claim 9, wherein the creating the user account includes automatically associating, in a database of the multi-tenant system, the created user account with the existing tenant.

12. The method of claim 9, wherein the determining whether the identifier specifies an existing tenant of the multi-tenant system comprises:

querying a table of the multi-tenant system for the identifier, wherein the tables includes identifiers of a plurality of existing tenants of the multi-tenant system; and in response to the identifier matching one or more identifiers of the plurality of existing tenants, determining that the identifier specifies an existing tenant.

13. An apparatus, comprising:

a processor; and a memory having instructions stored thereon that, when executed by the processor, cause the apparatus to perform operations comprising:

sending, by a multi-tenant system, a link to a potential user of the multi-tenant system, wherein the link includes an identifier generated based on an email address of the potential user, wherein the identifier specifies a tenant with which the potential user is associated, and wherein the link is sent in response to the potential user visiting a request webpage of the multi-tenant system and providing the email address in the request webpage;

receiving, via the link and from the potential user, a request for a webpage operable to create a user account with the multi-tenant system for the potential user;

in response to receiving the request, analyzing the link to determine the identifier included in the link;

determining whether the identifier specifies an existing tenant of the multi-tenant system;

in response to a determination that the identifier specifies an existing tenant:

selecting, by the multi-tenant system, a first webpage of a plurality of webpages, wherein the first webpage is operable to initiate creation of a user account with the multi-tenant system to be associated with the existing tenant;

sending, by the multi-tenant system, the first webpage to a browser of the potential user;

receiving, through the first webpage by the multi-tenant system, account information for the potential user;

in response to receiving the account information, creating, by the multi-tenant system, the user account for the potential user, wherein the user account is given data-access permissions based on the existing tenant; and     after creating the user account for the potential user, allowing the user account to access data of the multi-tenant system according to permissions held by the existing tenant; and in response to a determination that the identifier does not specify an existing tenant:

selecting, by the multi-tenant system, a second webpage of the plurality of webpages, wherein the second webpage is operable to initiate creation of a new tenant and a new user account for the potential user under the new tenant;

sending, by the multi-tenant system, the second webpage to the browser of the potential user;

receiving, through the second webpage by the multi-tenant system, the account information for the potential user; and     in response to receiving the account information, creating, by the multi-tenant system, the new tenant and the new user account, wherein the new user account is given data-access permissions based on the new tenant.

14. The apparatus of claim 13, wherein the determining the identifier includes parsing the link to extract the identifier.

15. The apparatus of claim 13, wherein the creating the user account includes automatically associating, in a database of the multi-tenant system, the created user account with the existing tenant.

16. The apparatus of claim 13, wherein the determining whether the identifier specifies an existing tenant of the multi-tenant system comprises:

querying a table of the multi-tenant system for the identifier, wherein the tables includes identifiers of a plurality of existing tenants of the multi-tenant system; and     in response to the identifier matching one or more identifiers of the plurality of existing tenants, determining that the identifier specifies an existing tenant.

* * * * *